Dec. 18, 1928.  1,695,276
H. C. FLOHR ET AL
SURFACING ELEMENT AND PROCESS OF MANUFACTURING THE SAME
Filed Feb. 6, 1926

INVENTOR
Henry C. Flohr
and Leon Ornstein
BY
ATTORNEY

Patented Dec. 18, 1928.

1,695,276

UNITED STATES PATENT OFFICE.

HENRY C. FLOHR, OF NEW YORK, AND LEON ORNSTEIN, OF BROOKLYN, NEW YORK.

SURFACING ELEMENT AND PROCESS OF MANUFACTURING THE SAME.

Application filed February 6, 1926. Serial No. 86,475.

This invention relates to surfacing elements and process of manufacturing the same and the object is to produce a surfacing element which will have a glass-like surface, which will be easy to apply, is unbreakable, that is, will not chip or crack, will not curl or warp, is not affected by temperature or humidity, and is sanitary, for use wherever it is desired to have a surface of this character, for instance, for the covering of walls, taking the place of the tiles which are now used, for covering tables, and in many other places where a porcelain-like surface is desired. We do not limit the invention to any particular use as its uses are manifold, and it may be produced in any desired size, that is, in large sheets where, for instance, it is used as a surfacing element for walls, and in smaller sheets for the covering of tables or other articles where only a small surface is required. The invention relates not only to the surfacing element itself, but to the process of producing the same, which is particularly set forth hereinafter.

Figure 1:
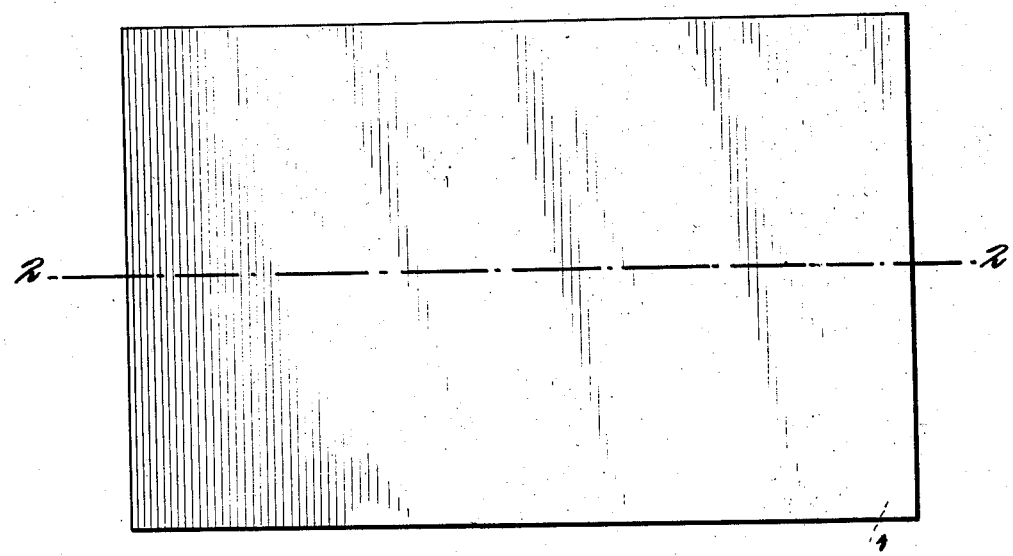
Figure 2:
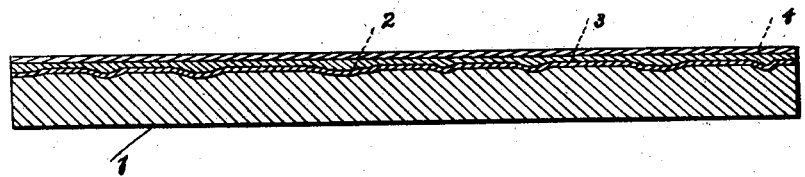

In the drawing, Figure 1 is a plan view of a portion of a sheet embodying our invention, and Figure 2, a section on the line 1—1 of Figure 1.

The surfacing element which we have produced comprises a base of what is commercially known as asbestos board, that is, an element composed of asbestos and Portland cement. This board may be of any desired thickness and of such dimensions as may be conveniently handled and also, of course, depending upon the purpose for which the surfacing element is to be used. For instance, for the covering of walls we found it desirable to take asbestos board of about $\frac{1}{8}$" in thickness, and about 4 × 8 ft. surface measurement. For the surfacing of walls this is a very desirable size as it may be quickly and easily applied.

To this base, which is marked with the numeral "1" in the drawing, we apply first a solution 2 which constitutes a penetrating and adhesive agent. This solution is composed of nitro-cellulose, gum and oil. Many different gums may be used, as, for instance, dammar, Congo, shellac, and others. We use a vegetable oil of which there are many, for instance, linseed, rapeseed and others. This penetrating and adhesive agent or solution is made up substantially of equal parts of nitro-cellulose and gum, and oil equal to approximately one-half of the amount of nitro-cellulose used, the nitro-cellulose and gum being dissolved in solvents, esters or other hydrocarbons. This penetrating and adhesive solution we apply to one side of the asbestos board base, either by machine or by atomizing or vaporizing. This is then permitted to dry, which will take from 15 minutes to half an hour.

We then proceed to the second step in the process of manufacturing our improved surfacing element, which consists in applying a filling compound 3 to fill the pores and depressions. This filling compound we manufacture from an amorphous substance, such as silex, kaolin, calcium carbonate, gypsum, magnesium carbonate, or magnesium compound, which we incorporate with a bodied vegetable oil, such as boiled linseed oil or other blown vegetable oils, and nitro-cellulose solutions in approximately the following proportions: 40% amorphous substance, 20% oil, and 40% nitro-cellulose solution. The nitro-cellulose is dissolved in any well known nitro-cellulose solvent. This filling solution is applied to the side of the asbestos board base which has been previously treated with the penetrating and adhesive solution or agent, the application being by machine or by atomizing or vaporizing. We then permit this filling solution to dry, which will take about half an hour.

We then apply the finishing or glass-like surface 4 which comprises a pigment of white or any other desired color suspended or incorporated in a nitro-cellulose solution, gum and oil, similar to the penetrating and adhesive solution which we first described. One or more coats of this surfacing solution are applied to obtain the desired effect.

The completed surfacing element presents the appearance of porcelain. That is, it has a hard glass-like surface which, as we have stated, is not affected by temperature or humidity and will not chip or crack. It is fireproof and sanitary. When used in bath rooms or any other place where tile is ordinarily used, it is very much more sanitary as, being in large sheets, the cement used between the tiles is avoided. Being made of the asbestos board base, it may be made thin and thereby reduce its weight to a minimum without curling or warping, and being of a minimum weight large sheets may be readily handled. Also by being of such light weight, it does not add any appreciable weight to a table or any article which it may be used to surface. It may be readily applied to the wall or to any other surface by cementing. We do not limit our invention to any particular size or any particular form, as it is obvious that it may be made of any desired shape and in any desired size.

Having thus fully described our invention, what we claim as new and desire to secure by Letters Patent of the United States, is—

1. A surfacing element comprising a base of asbestos board to which has been applied a penetrating and adhesive solution comprising a mixture of nitro-cellulose, gum and oil; a filling solution composed of an amorphous substance, oil and nitro-cellulose; and a coating of nitro-cellulose, gum and oil to form a glass-like surface.

2. A surfacing element comprising an asbestos board base to which has been applied a penetrating and adhesive solution composed of nitro-cellulose, gum and a vegetable oil; a filling solution composed of an amorphous substance, a bodied vegetable oil, and nitro-cellulose; and a finishing solution composed of a pigment incorporated with nitro-cellulose, gum and oil.

3. The process of producing a surfacing element consisting in first applying to one surface of an asbestos board base, a penetrating and adhesive solution, composed of nitro-cellulose, gum and oil, permitting the same to dry, then applying to the same surface of the asbestos board base, a filling solution comprising an amorphous substance, oil and nitro-cellulose, permitting the same to dry, and finally applying a finishing solution comprising a solution of nitro-cellulose, gum and oil to produce a hard glass-like finish.

4. The process of manufacturing a surfacing element consisting in applying to the surface of an asbestos board base, a penetrating and adhesive solution consisting of nitro-cellulose, gum and a vegetable oil, permitting the same to dry, and then applying a filling solution composed of an amorphous substance incorporated with a bodied vegetable oil and nitro-cellulose, permitting the same to dry, then applying a finishing solution comprising a pigment incorporated with nitro-cellulose, gum and a vegetable oil.

HENRY C. FLOHR.
LEON ORNSTEIN.